April 14, 1953

W. W. FRANK 2,634,815

REVERSIBLE PROPELLER

Filed Jan. 2, 1947

Inventor
Wilbert W. Frank
By J. P. Keiper
Attorney

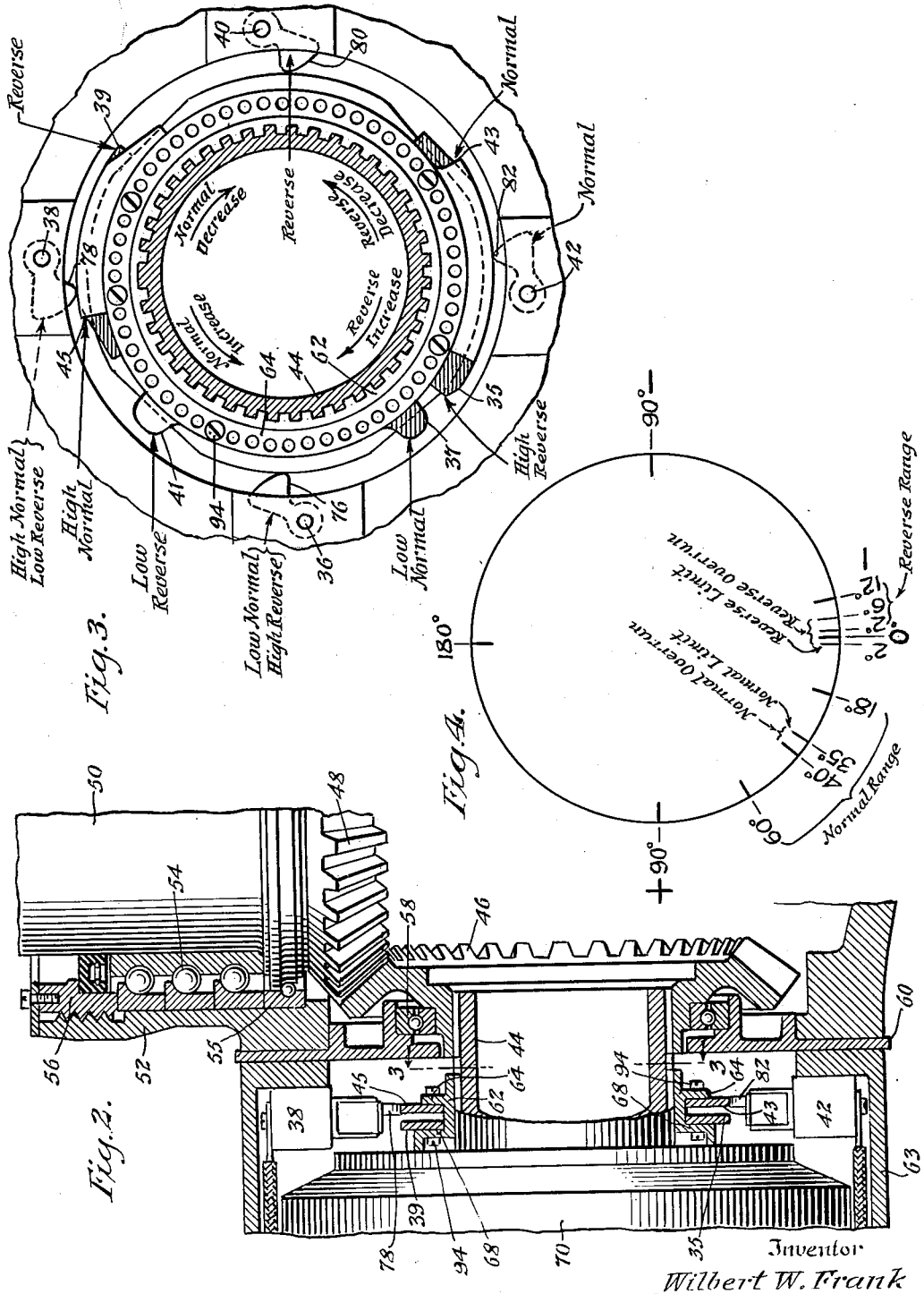

Patented Apr. 14, 1953

2,634,815

UNITED STATES PATENT OFFICE 2,634,815

REVERSIBLE PROPELLER

Wilbert W. Frank, Packanack Lake, N. J., assignor to Curtiss-Wright Corporation, a corporation of Delaware Application January 2, 1947, Serial No. 719,835

10 Claims. (Cl. 170—160.2)

This invention relates to a reversible pitch aircraft propeller and control mechanism for effecting fast pitch reversal and providing speed governing in both forward and reverse pitch.

For the purpose of improving the maneuverability of aircraft upon landing, the prime mover is adapted to function as a power brake by reversing the pitch of the propeller blades. In such systems, it is usual to reverse the propellers to a fixed reverse pitch limit and vary the aerodynamic braking effect through throttle control of the prime mover. In such systems, the rate of changing the pitch from forward to reverse has been relatively slow and requires the attention of the operator through throttle control to regulate the braking effect. The use of a fixed pitch limit in reverse pitch in combination with throttle control for varying the braking thrust is a matter of expedience since a small change in pitch of a propeller when in the reverse pitch range results in excessive changes in the torque load placed upon the prime mover, so that if a pilot were to vary the pitch to vary braking effect there would be danger of stalling the prime mover. In effecting a change of pitch from forward pitch through flat pitch to reverse pitch, there also exists some danger of over-speeding of the prime mover since when the propeller pitch is reduced to zero the prime mover load is momentarily reduced to zero, and any substantial delay encountered in passing through zero pitch would produce a sudden over-speeding condition of the engine, should the pilot fail to close the throttle. While governing the speed of a prime mover when in reverse pitch has been suggested by varying the pitch of the blades, extreme difficulty would be encountered because of the great load change sensitivity of the propeller to extremely small changes in pitch when in the reverse range. Unless provision can be made to attain reverse pitch before over-speeding can occur, it has been found desirable to provide a system wherein the engine throttle is first closed while the propeller traverses the zero pitch region. Any momentary closing of the throttle interrupts the continuous flow of power from the prime mover and is bound to delay for a definite period the time which must elapse before the reverse pitch can be effective to produce a maximum braking effect. Thus while reverse pitch has been employed in the manner set forth above for assisting in the landing of aircraft, it will be realized that during landing operations the speed of the aircraft is considerably reduced and the time required for actual development of reverse thrust need not be in the order of a split second, as would be desirable for braking power dives at high speed and for aerobatics generally.

It is accordingly an object of the present invention to provide a reverse pitch mechanism for an aircraft propeller in which reversal of pitch may be attained at such a high rate as to substantially eliminate danger of prime mover over-speeding during such reversal.

Another object of the invention is to provide in a propeller engine combination wherein through pitch variation of the propeller constant speed is maintained, a means for quickly reversing the pitch and the sense of the governor whereby constant speed control is substantially continuously maintained.

Still another object of the invention is to provide a propeller system capable of operating to maintain constant speed when either in forward or reverse pitch, with the rate of pitch variation when in reverse pitch substantially reduced to compensate for the increased load sensitivity of the propeller to pitch changes in the reverse pitch range.

Still another object of the invention is to provide in a propeller governor system in which the pitch of the propeller may be reversed, a mechanism for rapidly reversing the propeller pitch to within a desired range and thereafter establishing governor control over the pitch.

Yet another object of the invention is to provide a reversible pitch propeller and governor combination in which the propeller may normally vary within a range of forward pitch to control propeller speed and vary within a range of reverse pitch at a substantially decreased rate to control propeller speed and in which the pitch of the propeller may be quickly changed independent of governor control from within one range to a position well within the other range whereupon governor control is restored.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference characters indicate like parts,

Fig. 2 is a fragmentary sectional view taken through a part of the hub and a blade of a propeller to illustrate the limit switches for establishing certain ranges of pitch adjustment.

Fig. 3 is a cross sectional view of the power unit taken substantially on the line 3—3 of Fig. 2 showing the cams and switch followers for establishing the ranges of pitch adjustment referred to, and Fig. 4 is a circular diagram showing actual ranges of blade pitch angle which may be established by the cam arrangement of Figure 3 and employed in the operation of the system.

Figure 1:
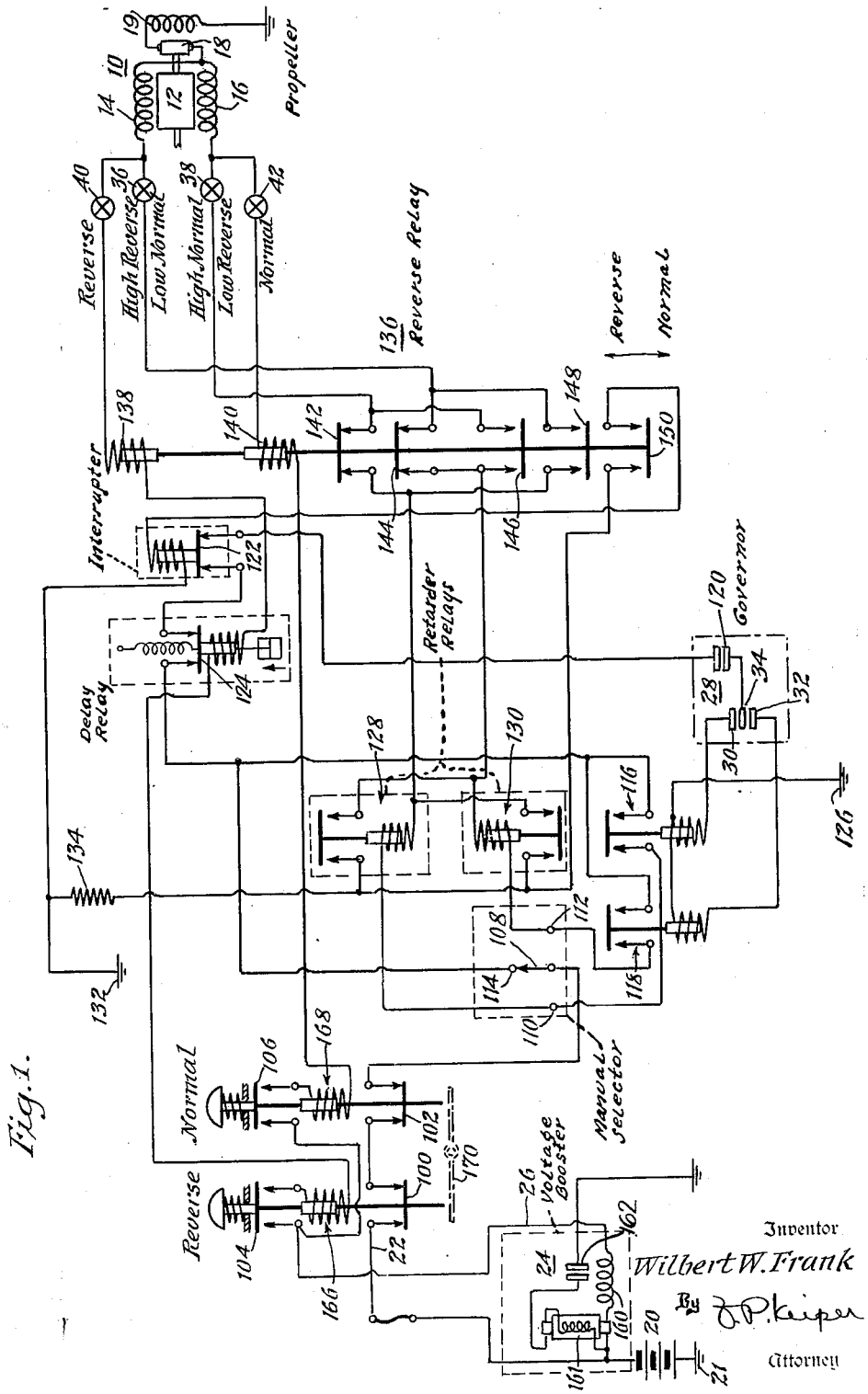
Figure 1 is a circuit diagram illustrating the control system as applied to an electric variable pitch propeller.

Referring to Figure 1, there is diagrammatically shown a reversible electric pitch changing motor 10, having an armature 12, reverse and forward fields 14 and 16, commutator 18 and a series electromagnetic release friction brake of well known type generally indicated by the brake coil 19 for holding the propeller in fixed pitch when de-energized and no change of pitch is required. Such a motor may be rotatably carried by the propeller and act through a planetary or other gear reduction system to alter the pitch of the blades, for example in the manner shown in Blanchard 1,951,320 or Palmer and McNeil 2,124,078.

Power for actuating the motor 10 may be derived from a battery 20, one side of which is grounded at 21, and the other side of which is connected to a battery potential bus 22. In order to provide momentarily an increase in potential to enforce rapid acceleration and high speed operation of the motor 10, a voltage booster 24 may be provided to establish higher potential in the voltage booster bus 26. To provide governor control over the pitch of the propeller blades so as to maintain a desired constant speed, a governor 28 is provided in which increase and decrease pitch contacts 30 and 32 respectively are provided such that upon an increase in speed above that desired, the inter-engaging contact 34 is made to close a circuit through contact 30 and upon a decrease in speed is made to close a similar circuit through contact 32. The governor may correspond to the governor shown in a copending application of Charles W. Chillson filed March 15, 1939 under Serial No. 261,879, now Patent No. 2,449,452.

In order to determine and limit the normal range of movement of the propeller blades, limit switches 36 and 38 are provided and are so connected as to function for the purpose specified in connection with both the normal range of pitch to be established, and a range of reverse pitch to be established. In transferring from one range to the other, additional limit switches 40 and 42 are provided so that as the propeller pitch approaches or attains the reverse or normal range of pitch variation desired operation of the pitch change motor is caused to be arrested. The limit switch 40 for example is adapted to initiate the arresting of the pitch change motor in or as it approaches the reverse pitch range whereas the limit switch 42 is adapted to initiate arresting of the motor at a selected position within the normal or positive pitch range.

Referring to Figures 2 and 3, it will be seen that the limit switches 36, 38, 40 and 42 are cam operated by suitably disposed cams mounted upon the output shaft 44 of the power unit. The shaft 44 is geared directly through a master gear 46 to each blade gear 48 carried upon the root end of each of the propeller blade shanks 50. It will be appreciated that the propeller blade is mounted within an integral hub socket 52 and retained therein by centrifugal load carrying anti-friction bearings 54 and a preload bearing 55 held in place by a threaded retaining ring 56. The master gear 46 is rotatably supported upon an anti-friction bearing 58 located in a bulk head 60 secured to the hub 52. The master gear 46 is splined to the power output sleeve 44 which carries thereon a splined double flanged ring 62 having spaced flanges 64 and 68 adapted to carry switch operating cams. The spline shaft 44 is driven from a suitable gear reduction unit 70 from the electric motor diagrammatically shown at 10 in Figure 1. Located about the cam ring 62 and secured within the housing 63 are limit switches 36, 38, 40 and 42, four in all, arranged at 90° intervals about the cam ring 62. Each of the switches are actuated by cam followers 76, 78, 80 and 82 each actuated by one or more of the cams 35, 37, 39, 41, 43 and 45 such that upon the cam followers being lifted radially outwardly by their respective cams, the circuit within the switch is broken. The cams are secured to the cam ring flanges 64 and 68 by bolts 94 located in the holes in the flanges, the latter providing suitable angular position adjustment.

Referring to the circuit of Figure 1, in more detail, it will be seen that the battery potential bus 22, is normally connected through the closed contacts 100 and 102 of manual "fast reverse" and "fast return to normal" switches 104 and 106 respectively, to a manual selector switch 108, adapted to connect the battery for manual pitch increase or decrease through contacts 110 and 112 respectively, or for automatic governor control through contact 114 connected to the contacts of the governor controlled increase and decrease pitch relays 116 and 118 respectively. The operating coils of the relays 116 and 118 are excited upon contact of the governor contact 34 with one or the other of contacts 30 and 32, when the governor safety contacts 120 are closed, and an interrupter relay 122 and time delay relay 124 are de-energized, so as to complete a circuit between selector switch contact 114 and a suitable ground 126.

It is desirable to effect substantially uniform increments of pitch change in either direction for maintaining constant speed through governor control. However, the centrifugal twisting moment of the blades resists increases in pitch, and assists decreases, ordinarily causing the motor 12 to operate at different speeds depending on direction. In this invention the blades are provided with counterweights to compensate such moments as will be well understood in the art.

In the system disclosed the speed reducer between the motor 12 and the propeller blades is of relatively low ratio. To obtain desired rates of pitch change for normal governing, along with high torque, it is therefore desirable to increase the motor field strength while still using the normal voltage available from the power source 21. As will become clear, the low ratio speed reducer is needed to enable high rates of pitch change at boosted voltage in making transitions from normal to reverse pitch and vice versa. Means are therefore provided to increase the field strength of the motor when normally increasing and decreasing pitch, to lower the speed of the motor, through the use of circuit completing retarder relays 128 and 130, which are adapted when the pitch change motor is changing pitch, to connect the dead motor field winding in parallel with the armature and to ground 132 through a suitable series low resistance 134. For example, when relay 118 is closed, calling for a decrease in pitch, the motor 10 is energized through field 14, and the series coil of the relay 130 is energized closing the contacts thereof and connecting field 16 to ground through resistor 134. The current flow in field 14 is thus increased since the field 16 and armature 12 both provide parallel paths of flow to ground, and since current is flowing in the field 16 in a direction opposite from normal, the fields 14 and 16 combine to increase the field strength and decreases armature speed. A similar result in the opposite sense is obtained upon a call for increased pitch through closing of the relay 116.

It will be observed that when the propeller blades are in the reverse pitch range, the direction of rotation of the pitch change motor must be changed to effect, for example an increase in reverse pitch while traveling in a direction that would effect a decrease of pitch in the normal range and similarly to effect a decrease in reverse pitch while oppositely traveling. To reverse the connections suitably, a reversing relay switch 136 is provided, actuated to normal position (as shown) or reverse position by relay coils 138 and 140, respectively. The switch may be of the "latch-in" or "snap-over" type so that upon momentary energization of either coil 138 or 140, the switch is actuated accordingly and held until the other coil is energized. In the position shown, contacts 142 and 144 complete proper circuits to the fields 16 and 14 respectively for increase or decrease of pitch, when in the positive or normal pitch range. Contacts 146 and 148 complete proper circuits to the fields 14 and 16 for the reverse pitch range.

The reverse range of pitch adjustment is relatively small compared to the normal or positive range, and an increment of pitch change in reverse or negative pitch produces engine load changes in the order of five fold the engine load change effected by the same increment in the positive range. Accordingly, it is desirable to substantially decrease the rate of pitch change or increments of change when in the reverse range. When the latching relay 136 is reversed, closing contacts 146, 148, and 150, an interrupter relay 122 is brought into action. Each time either of the governor relays 116 or 118 close, one or the other of the speed retarder relays 128 or 130 close, placing a potential across the resistor 134, regardless of whether or not a decrease of pitch is being effected and one of the motor fields is connected to ground therethrough. Whenever contacts 150 are closed, and a potential exists across resistor 134, the interrupter relay is energized thereby and opens the circuit to the governor contact 34 thereby cutting the flow of current to the pitch change motor after a momentary flow, to decrease substantially the increment of pitch adjustment. Thereafter depending upon the time relation, the interrupter relay is de-energized by the opening of either relay 116 or 118, and the consequent opening of the corresponding relay 128 or 130, whereupon the circuit to the governor contact 34 is re-established, and the interrupter cycle will repeat, so long as the governor contact 34 contacts one or the other of the contacts 30 or 32.

To effect quick pitch reversal, that is change from the positive or normal range to the negative or reverse range, or vice versa, the hand switches 104 or 106 are actuated. Closure of switch 104, opens the battery potential bus 22 through contact 100, and immediately establishes a potential in the series voltage booster relay coil 160, closing contacts 162 to ground to start the booster motor generator 161 to add potential above battery voltage to the booster bus 26 (unless it is already in operation through an auxiliary circuit). At the same time, the lock-in coil 166 is energized, the time delay relay 124 opened, the latching switch relay coil 138 energized, and the pitch change motor and its normal decrease pitch field 14 energized at high voltage, causing rapid pitch change. When the desired pitch in or approaching the reverse pitch range is attained, limit switch 40 opens the circuit, and after allowing a sufficient time for braking the motor, the time delay relay 124 closes its contacts, thereafter establishing governor control. Return to the normal or positive range, from the negative or reverse range is effected by actuation of manual switch 106, which completes a circuit through its lock-in coil 168 latching relay coil 140, limit switch 42 and the motor 10 through its proper field to produce rapid pitch change into the positive range, when limit switch 42 opens. A mechanical or other interlock 170 between the switches 104 and 106 may be provided to prevent accidental actuation of more than one switch at a time.

It may be noted that the time delay relay 124, is only employed to momentarily delay the establishment of governor control in the reverse pitch range until the high speed of the motor can be arrested, this being desirable in view of the great sensitivity to small pitch changes within this range, as hereinbefore set forth.

The ranges of normal or positive pitch and reverse pitch are indicated diagramatically in the circle diagram of Figure 4. The highest pitch in the positive range may be set at 60°, and the lowest pitch at 18°, whereas in the negative range, the lowest pitch may be −2°, and the highest pitch may be −12°. In shifting from within one range to the other, the limit switch 40 may be set to cut off at +2°, there being about 8° of overtravel before motion can be arrested, to ultimately place the blades at approximately −6° pitch. In the return to positive pitch or normal range, limit switch 42 may cut off at about +35°, there being an overrun of about 5°, to an ultimate pitch of 40° midway of the range unless the governor calls for a different pitch. It will be understood that the governor is permitted to take over promptly after the limit switch 42 is opened, whereas governor operation is delayed after limit switch 40 is opened to permit the blades to actually reach −6° and come substantially to rest.

In Figure 3, a cam arrangement with cam followers is shown. Each of the cam followers 76, 78, 80 and 82 actuate their respective switches to open their respective circuits when lifted by one or more of the cams. Switch 36 and its follower 76 is actuated by the low normal cam 37 upon clockwise rotation of the cam ring, to limit the lower end of the normal or positive range of pitch adjustment. If the propeller blades are in the reverse pitch range, the high reverse cam 35 will again trip switch 36 and its follower 76 to limit the increase in pitch in the reverse range beyond −12°. To place the blades within the reverse pitch range, the cam ring will rotate clockwise until the reverse cam 39 trips the switch 40 and its cam follower 80. Cams 35, 37 and 39 are on the lower flange 68 and the cam followers 76 and 80 of switches 36 and 40 are co-planar therewith. Counterclockwise rotation when in reverse pitch will cause cam 41 to trip switch 38 through cam follower 78. To return to the normal range, counterclockwise rotation of the cam ring will be effected until cam 43 trips switch 42 through its follower 82. Further counterclockwise rotation will bring the blade pitch to the high pitch limit, causing cam 45 to trip switch 38 through its follower 78. In the relation shown, switch 38 has been tripped and there has occurred some overrun. Cams 41, 43 and 45 are located upon the upper flange 64, and the cam followers 78 and 82 of switches 38 and 42 are located in co-planar relation therewith.

In practice, the booster voltage is sufficient to shift the pitch from one range to the other in a fraction of a second, and with the aid of counterweights to compensate for a portion or all of the centrifugal twisting moment, the gear reduction ratio between motor and blade gear may be less than 1000:1 to assist faster action. It will be appreciated that the location of the cams may be varied to suit conditions, and that in locating the cams, the gear ratio between the master gear 46 and blade gears 48 must be taken into account.

From the forgoing, it will be seen that fast control over the thrust characteristics of a propeller may be had to the end that full engine power may be almost instantly applied, either to provide tractive effort or braking effort, at the will of the pilot, and through a simple hand switch control. By the simple expedient, for example, of operating the hand switch 104, governor controlled reverse thrust may be established within a split second.

Though a single embodiment of the invention has been illustrated and described by an electric circuit and associated means, it is to be understood that the invention may be embodied in various equivalent arrangements. Various changes and substitutions may be made, without departing from the spirit of the invention as will be apparent to those skilled in the art and reference should therefore be had to the appended claims for a definition of the limits of the invention.

What is claimed is:

1. In an electric variable pitch propeller, a source of low potential, a source of high potential, a reversible pitch changing motor connectable at times to either source, switch means responsive to blade position for establishing and breaking circuits to said motor, said means establishing a range of positive pitch adjustment, a range of negative pitch adjustment, and a range effective to shift the blade position from one to the other of the first and second named ranges; a speed responsive governor to energize said motor from said low potential source for operation in one direction or the other, means actuated by positioning of the propeller blades in the negative pitch range to reduce the energy supplied to said motor by operation of said governor, means simultaneously operable to connect said motor to said source of high potential, to disconnect said governor transiently and to reverse the connections of said governor to thereby cause the blade position to traverse said last named range and thereby shift from one to the other of said first named ranges, and means actuated by attainment of the other range to reconnect said governor and to disconnect said high potential source.

2. In a variable pitch propeller, a hub, blades swivelly mounted therein for pitch variation, a variable speed electric motor for altering the pitch of said blades, a source of power, speed governor means connecting said source of power to said motor to effect changes of pitch at a nominal rate in the forward pitch range, means for increasing the potential of said source of power and for applying said increased potential to said motor to reverse the pitch of the propeller at a higher than nominal rate, means for establishing governor connections to said motor in reversed sense upon completion of the pitch reversal, and means comprising a pulsing interrupter in the reverse sense governor connection to decrease the speed of said motor to effect governor controlled changes of pitch in the reverse pitch range at less than nominal rate.

3. In a variable pitch propeller, a hub, blades swivelly mounted therein for pitch variation, a reversible electric motor for altering the pitch of said blades having forward and reverse fields each serially connected with an armature, means for separately energizing said fields for changing pitch and for concurrently shunting the other field in parallel with said armature through a resistor to increase the field strength, a governor means actuated thereby for controlling said energizing means, means to operate said motor for reversing the pitch of the propeller blades, means for reversing the sense of the governor actuated by said operating means, and relay means connected into the energizing means circuit when the propeller is reversed to periodically interrupt said energizing means for decreasing the rate of pitch change.

4. In a variable pitch propeller including a hub and blades mounted therein for pitch changing, reversible pitch changing mechanism connected to said blades to change the pitch thereof, means to energize said mechanism to operate at selectable high, intermediate, and low rates of pitch change, a pitch range selector adjustable to select normal positive pitch or reverse pitch, means actuated by adjustment of the selector from normal to reverse pitch and from reverse pitch to normal pitch to energize said mechanism for high rate of pitch change only for the period required by the blades to make the transition from one range to the other, means actuated by adjustment of the selector in the normal positive range and actuated also by the positioning of the blades in the normal pitch range to energize said mechanism for operation at intermediate rate of pitch change, and means actuated by adjustment of the selector in the reverse pitch range and actuated also by the positioning of the blades in the reverse pitch range to energize said mechanism for operation at the low rate of pitch change.

5. Mechanism according to claim 4 wherein said means to energize for high rate of pitch change includes devices to override said low and medium rate means during pitch transition, and to yield control of pitch change rate to said other means upon completion of pitch transition.

6. In a variable pitch propeller, a hub, blades mounted therein for pitch change, motor means connected to said blades operable to alter blade pitch, said motor means being operable at high, intermediate and low speeds to change blade pitch at different rates, blade pitch limit stops in the motor means-blade connection identifying normal and reverse blade pitch ranges, governor means selectively connectible to the motor means to operate the motor means at an intermediate speed, a selector for propeller operation in the normal pitch range, means actuated by said selector to connect said governor, said motor and said operating means together enabling governed propeller operation in the normal pitch range at intermediate rate of pitch change; a selector for propeller operation in the reverse pitch range, means to operate the motor means at a low speed, and means actuated by said reverse selector to connect said governor in reverse sense, said low speed operating means and said motor means for operation in the reverse pitch range at a low rate of pitch change.

7. In a variable pitch propeller, a hub, blades mounted therein for pitch change, motor means connected to said blades operable to alter blade pitch, said motor means being operable at different speeds to change blade pitch at different rates, blade pitch limit stops in the motor means-blade connection identifying normal and reverse blade pitch ranges, governor means selectively connectible to the motor, means to operate the motor means at an intermediate speed, a selector for propeller operation in the normal pitch range, means actuated by said selector to connect said governor, said motor and said operating means together enabling governed propeller operation in the normal pitch range at intermediate rate of pitch change; a selector for propeller operation in the reverse pitch range, means to operate the motor means at a low speed, means actuated by said reverse selector to connect said governor in reverse sense, said low speed operating means and said motor means for operation in the reverse pitch range at a low rate of pitch change; means to operate the motor means at a high speed, and means actuated by the normal and reverse selectors when the propeller is in the reverse and normal ranges respectively which transiently connects the motor to said high speed motor operating means in sense to change propeller pitch respectively from the reverse pitch range to normal pitch range, and from the normal pitch range to the reverse pitch range at a high rate of pitch change.

8. In a variable pitch propeller having a hub, blades mounted therein for pitch change and an electric motor connected to the blades, a power supply having a normal steady voltage output, connectible at times to the motor to operate same for an intermediate rate of pitch change, a booster circuit driven by the power supply having a steady high voltage output connectible at times to the motor to operate same for a high rate of pitch change, an interrupter circuit connectible at times to the motor, energized by the power supply and including a pulsing interrupter to pass an average amount of power substantially less than that provided by the power supply alone, connectible at times to the motor to operate same for a low rate of pitch change, and means selectively operable to connect to said motor either said steady power supply, said booster circuit or said interrupter circuit.

9. In a variable pitch propeller having a hub, blades mounted therein for pitch change and an electric motor connected to the blades, a power supply having a normal steady voltage output, connectible at times to the motor to operate same for an intermediate rate of pitch change, a booster circuit driven by the power supply having a steady high voltage output connectible at times to the motor to operate same for a high rate of pitch change, an interrupter circuit connectible at times to the motor, energized by the power supply and including a pulsing interrupter to pass an average amount of power substantially less than that provided by the power supply alone, connectible at times to the motor to operate same for a low rate of pitch change, means in said propeller establishing a normal positive pitch range, means in said propeller establishing a negative pitch range; and means to connect said steady power supply to said motor for operation of the propeller in the normal pitch range, means to connect said interrupter circuit to said motor for operation of the propeller in the reverse pitch range, and means to connect said booster circuit to said motor for operation of the propeller from the forward to the reverse pitch range and vice versa.

10. In a variable pitch propeller, a hub, blades mounted therein for pitch change, a reversible electric motor connected to said blades for altering the pitch thereof, a power supply selectively operable to energize said motor for increasing and decreasing blade pitch in the normal positive pitch range, limit switches defining the limits of said normal positive range, power augmenting means driven by said power supply, means selectively operable to operate said augmenting means and to connect it to said motor for driving the motor at high speed from positive pitch range to negative pitch range and vice versa, said selectively operable means including circuit switching to override said limit stops and to disconnect the power supply from the motor when the augmenting means is connected thereto, limit stops defining a negative pitch range, one of said stops being connected in the circuit of the motor and augmenting means to break that circuit when the blades have been driven to the reverse pitch range by the augmenting means, another circuit energized by said power supply and including a pulsing interrupter operable when the other circuit is closed to decrease the average power supplied through said other circuit, and means to connect said other circuit to the motor when the blades are in the reverse pitch range after said augmenting means has relinquished energization of said motor.

WILBERT W. FRANK.

References Cited in the file of this patent

UNITED STATES PATENTS

| Number | Name | Date |
|---|---|---|
| 2,076,202 | Lewellen et al. | Apr. 6, 1937 |
| 2,293,912 | Mullen | Aug. 25, 1942 |
| 2,346,007 | Chillson | Apr. 4, 1944 |
| 2,378,938 | McCoy | June 26, 1945 |
| 2,388,276 | McCoy | Nov. 6, 1945 |
| 2,410,630 | Chilman | Nov. 5, 1946 |
| 2,426,007 | Forsyth | Aug. 19, 1947 |
| 2,455,378 | McCoy | Dec. 7, 1948 |